United States Patent Office 3,775,310
Patented Nov. 27, 1973

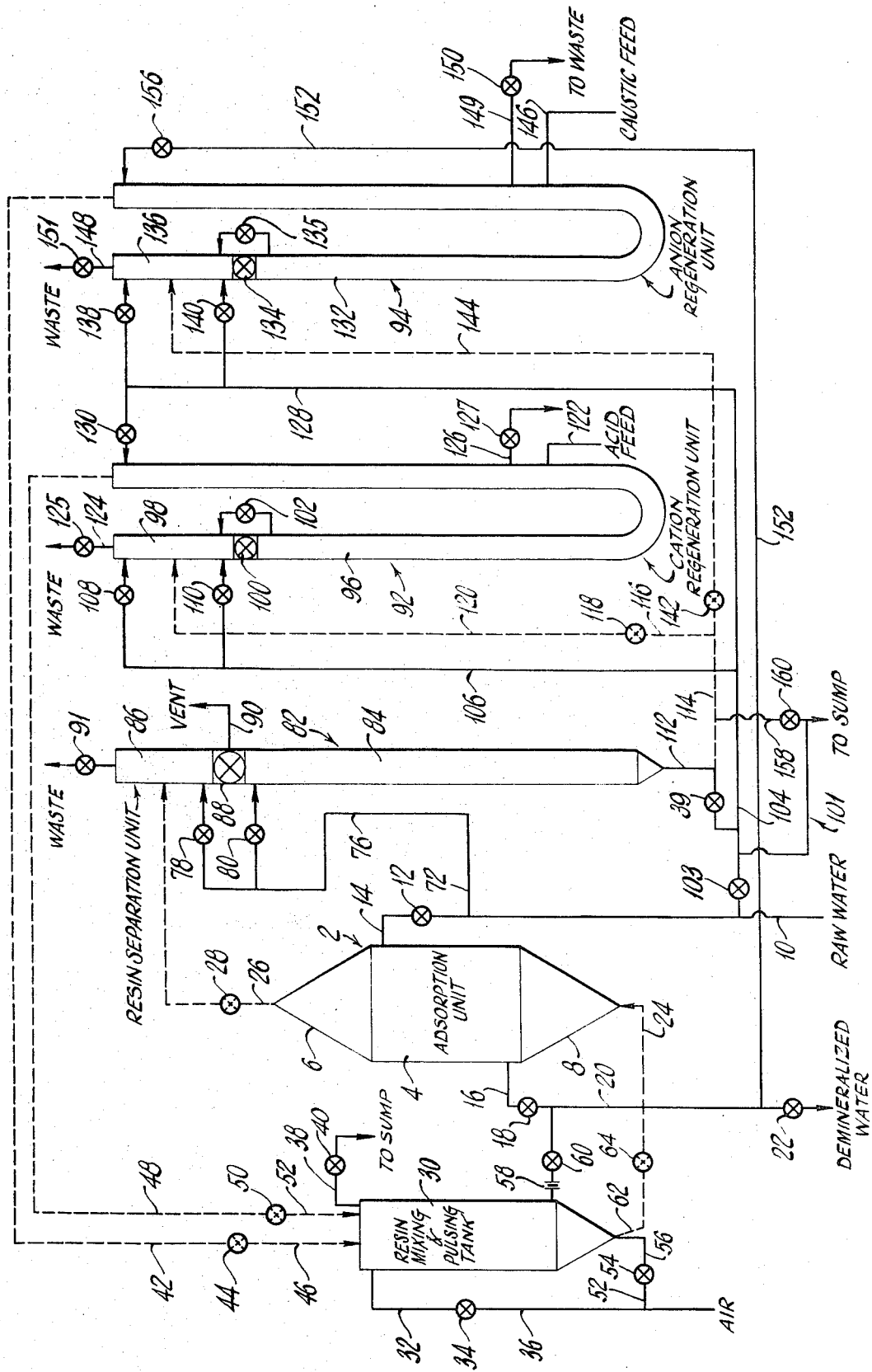

3,775,310
CONTINUOUS ION EXCHANGE
Joseph E. Conway, Collegeville, and William A. Keilbaugh, West Chester, Pa., assignors to Crane Co., Chicago, Ill.
Filed Mar. 12, 1971, Ser. No. 123,695
Int. Cl. B01d *15/06*
U.S. Cl. 210—33
20 Claims

ABSTRACT OF THE DISCLOSURE

In a continuous countercurrent adsorption apparatus, mixed adsorbents leaving the adsorption unit are separated, where necessary, in a separation unit and fed to appropriate regeneration units. Continuous flow of product is accomplished by utilizing the liquid medium in a mixing and/or pulsing tank during the resin replacement intervals.

BRIEF SUMMARY OF THE INVENTION

This invention relates to ion exchange apparatus or demineralizers and particularly to a continuous, mixed-bed ion exchange apparatus and the single bed apparatus, such as used in zeolite softening. A continuous ion exchange apparatus is one in which resin is moved either continuously or in intermittent steps which do not require substantial interruptions of the ion exchange operations and the flow of product.

Continuous, as contrasted with fixed-bed, demineralizers have certain advantages in applications such as the demineralization of boiler feed water and wherever it is necessary to demineralize large volumes of water having a relatively high dissolved solids content. Among these advantages are lower capital costs, economy of operation, the avoidance of fouling of the bed by liquid-borne suspended solids, substantial continuity of product flow, and the possibility of maintaining a uniform product by making continuous adjustments. In addition, a substantial reduction in the total volume of waste solutions should be realized.

The use of a mixed bed, that is, a bed consisting of mixed anionic and cationic resins contributes to the efficiency of a continuous demineralizer.

A typical continuous, ion exchange apparatus or demineralizer comprises an adsorption unit in which the removal of selected material from the process stream takes place, a pulsing apparatus for moving the resin mixture through the adsorption unit, a resin separation unit for separating cationic and anionic resins, when required, and one or more regenerating units which regenerate the resins and return them to the pulsing apparatus.

Both in adsorption and in regeneration, it is recognized that "countercurrent" operation produces certain advantages. Countercurrent operation denotes the movement of resin in the opposite direction to liquid flow.

An advantage of countercurrent flow in adsorption units includes the maintenance of better liquid- solid contact and increased efficiency of operation. Particularly, when resin is continuously moved upwardly, and raw water is made to flow downwardly through the resin, it is recognized that there is no need to maintain a high minimum flow rate to keep the resin in compact condition as is the case in adsorption units where liquids flow upwardly through the resin bed.

In regeneration, countercurrent movement of the resin and regenerant brings about exposure of the most highly regenerated resin to the least contaminated regenerant so that the last resin to leave the regeneration unit is exposed to regenerant that contains none of the ions (except for inherent impurities) being removed from the resin.

This maximizes the equilibrium forces between the adsorbent and the liquid medium, resulting in more efficient use of regenerants. The efficiency of the rinsing is similarly improved, causing a reduction in the adsorption unit leakage. Also, the continuous low flows of spent regenerants are easily combined for neutralization and disposal.

Heretofore, a number of problems have existed in continous demineralizers. One problem was the interruption of product flow which was necessitated each time a resin slurry was pulsed into an adsorption unit. While auxiliary reservoirs could be used to provide continuous flow under such circumstance, the maintenance of adequate product pressure in such a system would add greatly to the complexity of the apparatus.

In accordance with this invention, a continuous, mixed-bed ion exchange apparatus produces continuous product flow as a result of the utilization of demineralized water in a resin mixing and pulsing tank. Pressure is maintained on the product water during movement of resin by air which is also used to effect resin movement.

Another problem in continuous demineralizers previously used is the obtaining of adequate contact time in the regeneration units. Heretofore, it has been found necessary to provide regeneration units of great height, necessitating large expenditures of money in construction and maintenance.

In accordance with this invention, the cationic and anionic regeneration units are substantially identical, and each is the form of a U for height reduction. Part of each regeneration unit consists of a backwash and pulsing section which also serves as an extension of the regeneration unit to provide increased resin-regenerant contact.

In accordance with this invention one or more regeneration vessels may be used for each type of ion exchange resin. Adequate contact between resin and regenerant is afforded by the movement of small increments of resin through the regeneration vessels at rather high frequency.

The principal object of this invention, therefore, is to provide a continuous ion exchange apparatus which produces an uninterrupted flow of product.

Another object is to produce maximum resin-regenerant contact in the adsorption and regeneration units of the apparatus.

Another object is to provide a continuous, mixed-bed ion exchange apparatus which is relatively simple and inexpensive to construct, and which makes efficient use of regenerants.

Another object is to maximize the reuse of process water for improved operating economy and to minimize waste.

A further object of the invention is to provide an ion exchange apparatus which produces a uniform product.

Still further objects will be apparent from the following description when read in conjunction with the drawing.

BRIEF DESCRIPTION OF THE DRAWING

The single figure is a schematic diagram of a continuous mixed-bed ion exchange apparatus in accordance with the invention showing liquid and air flow paths in solid lines, and showing resin slurry flow paths in broken lines.

DESCRIPTION OF THE PREFERRED EMBODIMENT

Adsorption unit 2 is a vessel consisting of a cylindrical section 4 and conical end sections 6 and 8. The adsorption unit is conventional. Conical sections 6 and 8 are provided internally with distribution baffles for the purpose of preventing stratification of the anion and cation resins and to assure a uniform resin rise rate across the entire diameter of cylindrical section 4.

Adsorption, or demineralization, takes place within cylindrical section 4, raw water flowing inwardly from line 10, through valve 12 and line 14, and outwardly through line 16, valve 18, line 20 and valve 22 to a product outlet (not shown).

A resin mixture enters the vessel at the bottom through resin transfer line 24, and exits at the top through line 26 and valve 28. It will be apparent that, while the resin mixture moves upwardly through the adsorption unit, water flows downwardly to provide countercurrent adsorption.

A resin mixing and pulsing tank 30 is connected to a fluid, such as air under high pressure, through line 32, valve 34 and line 36. The connection of line 32 to the tank is near the top of the tank. An exit line 38 at the top of the tank with valve 40 is provided to exhaust excess resin transfer water.

Regenerated anion resins enter tank 30 through line 42, valve 44 and line 46. Regenerated cation resins enter tank 30 through line 48, valve 50 and line 52.

The source of air is also connected through lines 52, valve 54, and line 56 to the interior of tank 30 to introduce air into the tank for the purpose of mixing the regenerated anion and cation resins prior to introduction into the absorption unit.

The interior of tank 30 is connected through a restricted, pressure-reducing orifice 58 and valve 60 to produce line 20. A resin transfer line 62 connects to line 24 through valve 64 to provide for the movement of resin from tank 30 into the adsorption unit. The purpose of orifice 58 is to permit the flow of water from tank 30 to the product outlet during resin transfer, while maintaining sufficient pressure within tank 30 to effect resin transfer.

The lower part of the resin separation unit is a main separation column 84, and the upper part is a backwash-injection section 86 connected to section 84 through a valve 88. Valve 88 is vented on the downstream side. In one position it connects the interior of section 84 to the interior of section 86. In another position, it closes off section 86 and 84 and vents section 84 through vent connection 90. Valve 89 connects the raw water supply to the bottom of section 84 of the separation unit. Valve 91 is provided to exhaust the excess water in section 86 to waste.

Backwashing to remove resin fines and other debris takes place in section 86. Gravitational separation takes place in section 84.

As the separated resins exit the gravitational separation unit 82, it is conveyed hydraulically to the regeneration units 92 and 94.

Regeneration is accomplished by cation regeneration unit 92 and anion regeneration unit 94. These units are substantially identical, each comprising an upright U-shaped tube having a backwash and pulsing section at the upper end of one of its vertical columns. These units are intended to provide a large length/diameter ratio for good resin-regenerant contact with the lowest possible overall height requirement.

In unit 92, the U-shaped tube 96 is connected to a backwash and pulsing section 98 through a valve 100 and also through a bypass line fitted with a check valve 102.

Raw water is delivered from line 104 through line 106 to valves 108 and 110 connected respectively to upper and lower ends of section 98. Valve 110 permits the entrance of water for back-washing, while valve 108 may introduce water, or air, for pulsing the resin downwardly into the U-shaped section. Resin travels from the bottom of the separation unit 82 through lines 112, 114 and 116, valve 118 and line 120 to section 98. Acidic regenerant, typically sulfuric acid, is introduced at 122. An opening for exhausting backwash and spent regenerant is shown at 124 at the upper end of the backwashing and pulsing section 98. Opening 124 is provided with valve 125 and valve 159 through which resin transfer water is returned to the sump (not shown) for reuse. An opening 126 is provided above the acid feed inlet 122. This opening is provided with a throttling valve 127. Rinse water can be introduced into the right-hand column of unit 92 through line 128 and valve 130.

The anion regeneration unit consists of a U-shaped tube 132 connected through valve 134 and bypass line with check valve 135 to a backwash and pulsing section 136. Raw water or air for pulsing is introduced into section 136 through valve 138, and backwash water is introduced through valve 140. Resin to be regenerated is delivered from the separation unit through line 114, valve 142 and line 144.

Caustic regenerant is introduced at 146. An opening is provided at 148 for backwash and spent regenerant. Another opening is provided at 149 above the caustic feed line. Opening 149 is provided with a throttle valve 150, while opening 148 has valves 151 and 157. Demineralized rinse water can be introduced into the right-hand column of U-shaped tube 132 through line 152, line 154 and valve 156.

Regenerated cation resins are delivered to tank 30 from the upper end of the right-hand column of unit 92 through line 48. Regenerated anion resins are delivered to tank 30 similarly through line 42.

Resin fines resulting from attrition along with waterborne suspended solids are discharged from the system at the various backwash sections. With this system resins attrition losses are expected to be low, and replenishment of these resin losses is done manually.

All of the valves in the system just described except valves 127 and 150 are preferably provided with controllers such as pneumatically operated diaphragms so that they can be controlled by an appropriate automatic control system in the manner described below.

OPERATION

The overall operation of the ion exchange apparatus and associated method is substantially as follows:

Valves 50, 44, 54, 60, 34, and 64 associated with the resin mixing and pulsing tank 30 are initially closed while valve 40 is initially open. Tank 30 is atmospheric pressure. Water is passing from the raw water supply, through the adsorption unit to the product outlet.

Valves 44 and 50 are opened in order to transfer resin slurries from the regeneration units to the mixing and pulsing tank 30. As the resin slurries are transferred, excess resin transferred, excess resin transfer water is delivered to waste through line 38 and valve 40. On completion of the resin transfer, valves 44 and 50 are closed, and valve 54 is opened allowing air to enter through the bottom of tank 30 to effect mixing of the cation and anion resins in tank 30. The mixing air is exhausted through line 38 and valve 40. After sufficient mixing, valves 54 and 40 are closed.

The next step is to transfer the mixed resins from tank 30 to the adsorption unit 2. Valves 60, 64 and 28 are opened and valve 18 is closed. Valve 34 is then opened, and an air pressure builds up at the top of the interior of tank 30. This forces a slug of the mixture from the bottom of the tank through line 62, valve 64 and line 24 into the bottom of the adsorption unit. At the same time, water is forced through restricted orifice 58 and through valve 60 to line 20 from which it is delivered as product through the short period during which the slug of resin is transferred from tank 30 to the adsorption unit. Thus, product is delivered without interruption and under pressure. The mixed resins in the mixing pulsing tank 30 are effective to demineralize the water which is delivered as product during resin transfer.

With this system, the available product flow rate during the transfer interval for a small unit can be almost as great or even greater than the normal product flow rate. In a typical installation, however, it is probable that an interim product flow rate not greater than 50% of the normal flow rate will be provided.

As fresh resin enters the bottom of adsorption unit 2, an equal amount of exhausted resin mixture is forced out of the top of unit 2 through line 26. It is delivered through valve 28 into section 86 of the resin separation unit. Raw water via line 14 is used as a hydraulic assist for the transfer of resin from the adsorption unit 2 to section 86 of the resin separation unit.

At the end of each resin transfer cycle, valves 34, 60, 64 and 28 are closed and valves 18 and 40 are opened. Normal delivery of product through the adsorption unit is resumed, and a further resin transfer operation can be initiated whenever determined by an automatic control apparatus or by an operator.

Exhausted mixed resin is then transferred from the adsorption unit by way of valve 28 to the backwash-injection section 86 of unit 82. Excess slurry water is discharged to waste through valve 91. Upon completion of this transfer, valve 28 is closed.

The backwash valve 78 is then opened, and the resin is expanded by backwashing. "Curd" and resin fines are discharged with the backwash water to waste through valve 91. The backwashing operation effects a preliminary reclassification of the resins which improves the overall performance of the separator unit. After sufficient backwash, which might typically require one minute, valve 78 is closed. During this time the main separation section is filled with water by opening valves 80 and 89. Excess water flows to a sump through valve 160.

Valves 88 and 118 are then opened, with valve 160 closed. The resin in section 86 then drops into section 84 in which the cation resins are separated gravitationally from the anion resins by virtue of the difference between their densities. The cation resin reaches the bottom first, and is delivered through lines 112, 114, 116, valve 118 and line 120 to section 98 of the cation regeneration unit 912. The transfer water is returned to the sump (not shown) for reuse. After delivery of the cation resin, and as the anion resin begins to exit section 84, valve 118 is closed and valve 142 is opened allowing the anion resin to travel to the anion regeneration unit 94 through line 144.

Both regeneration units 92 and 94 operate in the same manner so that only the cation regeneration will be described. It will be understood that the U-shaped tubes 96 and 132 of both regeneration units are full of resin at all times and that as an incremental quantity of resin is introduced into the U-shaped tube from the resin injection and pulsing section, an equal increment is delivered through the return line 42 or 48.

The first step is the introduction of regenerant and rinse water into the U-shaped tube 96. This is accomplished by opening valves 125 and 130. Rinse water is fed from the raw water supply, through line 128 and valve 130 into tube 96. Regenerant, typically dilute sulfuric acid, is introduced through line 122 and is further diluted and mixed with the water in the tube.

Valve 118 is opened, valve 88 is adjusted to close off section 84, and valve 80 is opened. Resin, in a slurry form is transferred to the injection-backwash section 98 by the force of the water introduced through valve 89. Excess water from the slurry is delivered to the sump (not shown) through valve 159 and line 160. Valves 118 and 159 are closed when it is determined that substantially all of the cation resin has been delivered to section 98. (Anion resin is transferred in a subsequent step by opening valve 141.)

Valve 118 is then closed, and valve 110 is opened to produce a backwash flow within section 98 in order to remove resin fines. Throughout this time, rinse water not only dilutes the regenerant, but also flows into section 98 through the line which bypasses valve 100, the latter being presently closed. In this manner, the diluted regenerant operates not only on the resin in section 96, but also on the resin in 98. Thus, section 98 acts as an extension of the regeneration section, reduces backwash water requirements for removal of resin fines, "crud," and unwanted reaction products, and permits initial swelling of the resin to occur while it is in a fluidized state thus reducing attrition losses. Also, this exposure to very dilute regenerants greatly reduces the problems associated with calcium sulfate precipitation in packed beds. The greater use of chemical regenerants made possible by this bypass also minimizes further the waste disposal problem.

After a sufficient backwashing, valve 110 is closed. Valve 127 is closed, valve 50 is opened, and the regenerant feed is stopped. Valve 100 is opened, and after a slight time delay, valve 108 is opened. When valve 127 closes and valve 50 opens, the rinse water entering regenerating section 96 through valve 130 is diverted through valve 50 into the resin mixing and pulsing tank 30. The pressure on both sides of valve 100 is equalized by means of its bypass before it is opened, valve 100 is then opened and the subsequent opening of valve 108 increases the pressure within section 98, and forces resin in that section downwardly through valve 100 into section 96. An equal amount of regenerated resin is delivered to tank 30 through line 48. Valves 108, 50 are then closed and valve 159 opened. Then valve 127 is opened and 100 closed. The reason for this valving sequence is that the main valve 100 will not have to operate against pressure. This should reduce maintenance and extend its useful life. The regeneration cycle is then ready to be repeated.

For purposes of clarity a brief description of the sequential operations of the ion exchange apparatus and associated method is as follows:

As clearly shown in the drawing, feed enters the adsorption vessel 4 through line 14, flows downward through the bed, and is discharged through line 16 as product.

A predetermined volume of freshly regenerated mixed cation and anion resin is pulsed by pneumatic pressure from the resin mixing and pulsing tank 30 through line 24 into the bottom of the adsorption vessel 4. An equal volume of exhausted resin will be displaced upward from the top of said adsorption vessel 45 and discharged through line 26 and valve 28.

During this resin pulsing period the flow of product water from the adsorption vessel is stopped by closing valve 18. This causes the feed water to be diverted upward, thus providing slurry water for transferring the exhausted resin through line 26 and valve 28 to the backwash and resin injection section 86 of the separation unit 82. Excess transfer water is discharged from this section to waste through valve 91. A reduced flow of product water is maintained during the resin pulsing sequence by opening valve 60.

After the resin pulsing has been completed valves 28, 60, and 64 are closed. The normal flow of water through the adsorption unit is resumed by opening valve 18.

The resin in section 86 is backwashed, permitted to settle, and then injected into the main separation column 84 through valve 88. Due to the difference in their densities a gravimetric separation of the resins will occur with the heavier cation resins bottoming first. As the separated resins are discharged from the separation unit 82 they are hydraulically transported to the cation and anion regeneration units.

The backwash and resin injection section 86 of the separation unit 82 can now accept another pulse of exhausted mixed resin from the adsorption unit 4. The separated cation resin is transferred as a slurry through valve 118 and line 120 to the backwash section 98 of the regeneration unit 96. Excess transfer water is discharged through valve 159 and line 160 to the sump for reuse. When the transfer of cation resin is completed valves 118 and 159 are closed and valves 142 and 157 are opened providing a flow path for the anion resin through line 144 to its regeneration unit 94.

In sections 98 and 136 of the cation anion regeneration units 92 and 94 respectively, the resins are backwashed and exposed to very dilute regenerant solutions. They are then pulsed into the main sections 96 and 132 of the regeneration units, and the backwash sections are then valved to receive the next volume of resin from the separation unit 82.

With subsequent pulsing, each "slug" of resin is displaced incrementally through a regeneration zone in sections 96 and 132 and then through their respective rinsing zones. The fully regenerated and rinsed resins are then displaced from the regeneration units and transferred as slurries through lines 48 and 42 to the resin mixing and pulsing tank 30, wherein the freshly regenerated and rinsed resins are air mixed prior to being pulsed into the adsorption unit 2.

We claim:
1. Ion exchange apparatus comprising:
   (a) an adsorption vessel for containing a quantity of cation and anion ion-exchange resins;
   (b) means for conducting water into said adsorption vessel and out of said adsorption vessel to a product outlet;
   (c) means for removing exhausted resins from said adsorption vessel;
   (d) means for effecting separation of said resins;
   (e) means for conveying said separated resins to their respective regeneration vessels;
   (f) plurality of regeneration means each having first and second sections, means interconnecting said respective sections and valve means in the interconnection between said respective sections for allowing the passage of resin from the first section to the second section and a passage connected in parallel with said interconnecting means;
   (g) means for introducing water into said first section to wash said exhausted resins;
   (h) means for introducing a regenerant into said second section, for diluting said regenerant and for passing said diluted regenerant through said second section, through said restricted passage, and through said first section; and
   (i) means for delivering regenerated resin from the second section of said regeneration means to a mixing and pulsing tank.

2. Apparatus according to claim 1 in which the second section comprises first and second vertical columns and means connecting and allowing flow of resin and liquid between said columns at their lower ends, and in which said first section is a tubular section having its lower end connected to the upper end of one of said columns through said interconnecting means and said restricted passage.

3. Apparatus according to claim 1 in which said means for delivering regenerated resin from said regeneration means to said adsorption vessel includes a pulsing vessel for receiving said regenerated resin and means for forcing said regenerated resin under pressure from said pulsing vessel into said adsorption vessel.

4. Ion exchange apparatus comprising:
   (a) an adsorption vessel for containing a quantity of mixed anion and cation exchange resins;
   (b) means for conducting water into said adsorption vessel and out of said adsorption vessel to a product outlet;
   (c) means for receiving exhausted resin mixture from said adsorption vessel and for separating the cation resin from the anion resin;
   (d) means for regenerating the separated cation resin;
   (e) means for regenerating the separated anion resin;
   (f) means for returning the regenerated resins to said adsorption vessel;
   (g) means to return regenerated resins to said mixing and pulsing tank, wherein each of said regenerating means comprises first and second sections, means interconnecting said sections, valve means in the interconnection between said sections for allowing the passage of resin from the first section to the second section, a passage connected in parallel with said interconnecting means, and including:
   (h) means for introducing the exhausted resins from said separating means to the first section of their respective regenerating means;
   (i) means for introducing water into said first section of each regenerating means to wash the exhausted resin; and
   (j) means for introducing regenerant into said second section of each regenerating means, for diluting said regenerants, and for passing the diluted regenerants in each regeneration means through its second section, passage, and first section.

5. Apparatus according to claim 4 wherein said passage is of restricted configuration.

6. Apparatus according to claim 4 in which said means for returning the regenerated resins to said adsorption vessel comprises a mixing and pulsing vessel for receiving said regenerated resin, means for mixing the regenerated resins in said mixing and pulsing vessel, and means for forcing said regenerated resins under pressure from said pulsing vessel into said adsorption vessel.

7. Apparatus according to claim 6 in which said means for mixing the regenerated resins includes means for introducing air under pressure into the mixing and pulsing vessel;

8. The method of regenerating an exhausted ion exchange resin comprising the steps of:
   (a) introducing said exhausted resin into both sections of regeneration means comprising first and second sections connected by a valved interconnection in parallel with a restricted passage;
   (b) introducing water into said first section to wash the resin in said section; and
   (c) passing regenerant solution into said second section and through said restricted passage into said first section.

9. The method of claim 8, wherein the steps of introducing water and passing regenerant are carried on simultaneously.

10. An adsorption apparatus comprising an adsorption vessel for containing a quantity of solid adsorbant,
    a product outlet;
    means for conducting water into the adsorption vessel and out of the adsorption vessel to the product outlet;
    means for receiving exhausted adsorbant from the adsorption vessel and for regenerating said exhausted adsorbant;
    a pulsing vessel for containing adsorbant in a water medium prior to conduction into the adsorption vessel;
    means for conducting regenerated adsorbant from the regenerating means to the pulsing vessel;
    means for effecting rinsing of said regenerated adsorbant prior to its introduction into the pulsing vessel;
    means for intermittently conducting adsorbant from the pulsing vessel into the adsorption vessel to replace exhausted resin; and
    means for delivering water from the pulsing vessel to the product outlet during replacement of exhausted adsorbant, thereby permitting a substantially continuous flow of high quality product at the product outlet.

11. An apparatus according to claim 10 including pressure-reducing means in the path of flow of water from the pulsing vessel to the product outlet.

12. A continuous, mixed-bed ion exchange apparatus comprising:
    an adsorption vessel for containing a quantity of mixed anion and cation exchange resins;
    a product outlet;

means for conducting water into the adsorption vessel and out of the adsorption vessel to the product outlet;

means for receiving exhausted resin mixture from the adsorption vessel and for separating the cation resin from the anion resin;

means for regenerating the separated cation resin;

means for regenerating the separated anion resin;

a pulsing vessel for containing the resin mixture in a water medium prior to conduction into the adsorption vessel;

means for conducting regenerated resins from the regenerating means to the pulsing vessel;

means for intermittently conducting the resin mixture from the pulsing vessel into the adsorption vessel to replace exhausted resin; and means for delivering water from the pulsing vessel to the product outlet during replacement of exhausted resin, thereby permitting a substantially continuous flow of high quality product at the product outlet.

13. An ion exchange apparatus according to claim 12 in which the means for conducting regenerated resins from the regenerating means to the pulsing vessel includes means for effecting rinsing of said regenerated resins prior to their introduction into the pulsing vessel.

14. An ion exchange apparatus according to claim 12 including pressure-reducing means in the path of flow of water from the pulsing vessel to the product outlet.

15. The method of producing a substantially continuous flow of high quality product from an adsorption apparatus in which exhausted adsorbant is intermittently conducted from an adsorption vessel, regenerated, thereafter temporarily stored in a pulsing vessel in a water medium and intermitently conducted from the pulsing vessel into the adsorption vessel, comprising the steps of:

normally effecting flow of water through the adsorption vessel to a product outlet:

rinsing the adsorbant following its regeneration and prior to its introduction into the pulsing vessel;

applying pressure to the adsorbant and water medium in the pulsing vessel to force adsorbant from the pulsing vessel into the adsorption vessel; and while applying said pressure, conducting water from the pulsing vessel to the product outlet.

16. The method of claim 15 in which the water is conducted from the pulsing vessel to the product outlet through pressure-reducing means.

17. The method according to claim 15 in which the adsorbant is an ion exchange resin.

18. The method of producing a substantially continuous flow of high quality product from a continuous, mixed-bed ion exchange apparatus, in which exhausted anion and cation exchange resins are intermittently conducted out of an adsorption vessel, separated from each other, regenerated in separate regeneration vessels, thereafter mixed together and temporarily stored in a pulsing vessel in a water medium and intermittently conducted from the pulsing vessel into the adsorption vessel, comprising the steps of:

normally effecting flow of water through the adsorption vessel to a product outlet;

applying pressure to the adsorbant and water medium in the pulsing vessel to force adsorbant from the pulsing vessel into the adsorption vessel; and while applying said pressure, conducting water from the pulsing vessel to the product outlet.

19. The method according to claim 18 in which the resins are rinsed following regeneration and prior to introduction into the pulsing vessel.

20. The method according to claim 18 in which water is conducted from the pulsing vessel to the product outlet through pressure-reducing means.

References Cited

UNITED STATES PATENTS

| 3,674,685 | 7/1972 | Arden et al. | 210—33 |
| 2,528,099 | 10/1950 | Wilcox et al. | 210—189 X |
| 3,554,376 | 1/1970 | Kunz | 210—189 |
| 3,351,488 | 11/1967 | Zevers et al. | 210—33 X |
| 3,325,011 | 6/1967 | Keller | 210—189 X |
| 3,565,798 | 2/1971 | Barnes | 210—19 |

FOREIGN PATENTS

| 1,292,979 | 4/1962 | France | 210—33 |

FRANK A. SPEAR, Jr., Primary Examiner

U.S. Cl. X.R.

210—189

UNITED STATES PATENT OFFICE
CERTIFICATE OF CORRECTION

Page 1 of 2

Patent No. 3,775,310     Dated November 27, 1973

Inventor(s) Joseph E. Conway and William A. Keilbaugh

It is certified that error appears in the above-identified patent and that said Letters Patent are hereby corrected as shown below:

IN THE SPECIFICATION

Column 3, line 74 to Column 4, line 1 delete "and valve 159 through which resin transfer water is returned to the sump (not shown) for reuse".

Column 4, line 18, delete "and 157".

Column 4, line 20, delete "line 154".

Column 5, line 22, delete "Curd" and insert therefor -- Crud --.

Column 5, line 38 delete "912" and insert therefor --92 --.

Column 5, lines 62 to 64, delete "excess water is delivered to the sump (not shown) through valve 159 and line 160. Valves 118 and 159 are "and insert therefor -- Valve 118 is --.

Column 6, lines 70 to 71, delete "excess transfer water is discharged through valve 159 and line 160 to the sump for reuse".

Column 6, line 73, delete "and 159 are" and insert therefor -- is --; Same line, delete, "and 157" and insert therefor -- is --.

UNITED STATES PATENT OFFICE
CERTIFICATE OF CORRECTION

Patent No. 3,775,310                  Dated   November 27, 1973

Inventor(s)   Joseph E. Conway and William A. Keilbaugh

It is certified that error appears in the above-identified patent and that said Letters Patent are hereby corrected as shown below:

(CONTINUED)

IN THE DRAWING

Change valve "39" to valve --89--.

Delete "line 101".

Delete "valve 103".

Signed and Sealed this twenty-fifth Day of May 1976

[SEAL]

Attest:

RUTH C. MASON  
Attesting Officer

C. MARSHALL DANN  
Commissioner of Patents and Trademarks